United States Patent

Goodman

[15] 3,666,992

[45] May 30, 1972

[54] PROTECTIVE MEANS FOR DISTRIBUTION TRANSFORMER

[72] Inventor: Ernest A. Goodman, Pittsburgh, Pa.

[73] Assignee: Allis-Chalmers Manufacturing Company, Milwaukee, Wis.

[22] Filed: Oct. 22, 1970

[21] Appl. No.: 83,070

[52] U.S. Cl. ............................................. 317/15, 317/40 A
[51] Int. Cl. ................................................................. H02h 7/04
[58] Field of Search ........................................... 317/15, 40 A

[56] References Cited

UNITED STATES PATENTS

| | | | |
|---|---|---|---|
| 3,178,613 | 4/1965 | Dornbush et al. | 317/15 |
| 3,292,048 | 12/1966 | Swoish et al. | 317/15 |
| 3,365,616 | 1/1968 | Hermann | 317/15 |
| 3,350,526 | 10/1967 | Anderson | 317/15 X |
| 3,255,383 | 6/1966 | Astleford | 317/15 |

Primary Examiner—James D. Trammell
Attorney—Lee H. Kaiser, Thomas F. Kirby and Robert B. Benson

[57] ABSTRACT

A distribution transformer for use on a high voltage power distribution system having high fault current capability is protected over the entire range of fault currents by a secondary breaker which opens on low magnitude currents caused by secondary faults, a protective link which melts on low magnitude primary fault currents, and in series with the protective link a current limiting fuse which does not operate in the low fault current range but interrupts low impedance, high magnitude primary fault currents. The current limiting fuse is disposed within the axial bore in a primary bushing having a conductive line shield on its inner surface to eliminate high voltage gradients in the vicinity of the fusible elements of the current limiting fuse and thus minimize corona and radio frequency voltage, and the conductive line shield is terminated at a point which provides enough electrical clearance between the line shield and the lower terminal of a melted current limiting fuse to prevent a fuse restrike or a physical or electrical bushing failure.

10 Claims, 3 Drawing Figures

Patented May 30, 1972

Inventor
Ernest A. Goodman
By Lee H. Kaiser
Attorney

Patented May 30, 1972

Inventor
Ernest A. Goodman
By Lee H. Kaiser
Attorney

PROTECTIVE MEANS FOR DISTRIBUTION TRANSFORMER

This invention relates to the protection of electrical transformers and in particular to the protection of distribution transformers connected to high voltage power distribution systems having high fault current capability.

BACKGROUND OF THE INVENTION

Distribution transformers are often connected to an electrical power system through a primary fuse, termed a protective link, which disconnects the transformer from the primary feeder when a transformer primary fault or low impedance secondary fault occurs. The blowing of the protective link protects the power system and prevents interruption of service to other loads supplied over the feeder. A distribution transformer may also be provided with a secondary circuit breaker to protect against secondary fault currents and overheating due to overload.

The primary fuse may be mounted separately in a fused cutout on the pole, but such separately mounted cutouts are both expensive and aesthetically displeasing in residential areas, and consequently protective links are frequently mounted within the transformer casing. Protective links are conventionally of the expulsion type wherein the fusible element extends through a gas generating fuse tube, and the explosive force of a confined arc is utilized to expel gas from the fuse tube and thus interrupt the arc. Further, the protective link depends on the insulating oil to aid in extinguishing the arc upon interruption and, consequently, is mounted below the oil level in the transformer.

Transformer protective links do not provide adequate protection to the transformer against a low or a zero impedance primary internal fault when the available fault current in the power system is relatively high. Even when the protective link is capable of clearing a high magnitude fault current, extensive damage to the transformer and possible rupture of the transformer casing may occur as the fault is cleared.

As electrical power systems grow in size and generating capacity, the available fault current at any point in the power system increases. Power system interconnections add to the effective system fault capability, at least during the initial current surge, until such interconnections are opened. More and more utilities are converting their distribution systems to higher voltages which often result in high fault currents because at least one voltage transformation with its fault current limiting impedance is eliminated. The continuing increase in capacity of distribution systems that is necessary to match growing demand has been obtained for the most part by raising distribution voltage levels and increasing the number and size of distribution substations. These and other means of system reinforcement have all tended to contribute to a higher fault duty. In some distribution systems the short circuit capability is limited only by the generators, the generator transformers, the transmission systems, and the substation transformer which may step voltage down directly from as high as 500 kilovolts to 34.5 or 25 kilovolts, three phase, and in such systems fault currents as high as 20,000 amperes RMS may be available at 19.9 or 14.4 kilovolts line-to-ground. Outdoor fuses installed in disconnects or cutouts are available at such voltage rating, but as described hereinbefore such fused disconnects are expensive and aesthetically displeasing in residential areas and, further, a current limiting fuse is usually necessary to clear a fault current of this magnitude.

Although a protective link within the transformer casing solves the appearance problem posed by a separately mounted cutout, the protective link provides no protection to the transformer itself against a low or a zero impedance primary internal fault when system fault currents are of this magnitude. Further, even as it interrupts successfully, the protective link generates gases which add to the then existing transformer internal pressure, thus presenting a potential hazard. A protective link is an expulsion type device and therefore supplies little current-limiting or energy-limiting protection. When a major fault occurs, the protective link will allow the first half cycle of fault current to pass unattenuated and then will clear the fault at the next current zero. An expulsion fuse can only clear a current at a normal current zero, and the duration of fault current flow may be in the range from one-half cycle to one cycle or greater dependent upon such factors as the magnitude of fault current, the melting time of the fuse, the point in the cycle at which the fault is initiated, and the characteristics of the fuse. In the case of a low current incipient fault, a pressure relief device on the transformer casing can maintain internal pressure within safe limits, but in the case of a sudden fault of very high magnitude, such a pressure relief device may not respond sufficiently rapidly to prevent rupture of the transformer casing.

Prior art distribution transformers are known having the primary fuse disposed within the central bore of a primary insulating bushing which extends through the cover of the transformer casing, but such arrangements result in the production of corona and the generation of high frequency voltages in the radio frequency portion of the radiant energy spectrum. The fuses are located near surfaces of the grounded metallic cover which are of a polarity opposite to that of the fuse itself and thus tends to result in a high electrical gradient. The small diameter of the fuse wire in this electric field creates a high electrical gradient within the fuse which may exceed the corona starting voltage of the surrounding air and result in the production of corona and the generation of radio frequency voltages that produce interference with radio and television reception.

Prior art distribution transformers are also known having the primary winding connected to the primary feeder through a current limiting fuse to protect against very high magnitude system fault currents, but a current limiting fuse may not be effective as an interrupting device for very low fault currents and may actually not clear such a low magnitude fault current, but rather may overheat and ultimately rupture.

OBJECTS OF THE INVENTION

It is an object of the invention to provide improved protective means for a distribution transformer to be used on a high voltage power distribution system having very high available system fault current which is capable of interrupting current over the entire fault current range including very low fault currents. Another object is to provide such improved protective means which may be used on power distribution systems having voltage ratings up to 34.5 kilovolts, three phase. A further object of the invention is to provide such improved protective means which is mounted internally of the transformer and is thus protected from the weather and does not require a separately mounted fuse cutout. Still another object of the invention is to provide such improved protective means for a distribution transformer wherein the corona level and radio frequency voltage are within industry standard limits at rated voltage and also with 10 percent overvoltage impressed upon the transformer. A still further object of the invention is to provide such improved distribution transformer protective means which is inexpensive in cost and pleasing in appearance.

It is a specific object of the invention to provide such improved protective means for a distribution transformer having a current limiting fuse within the central bore in a primary bushing, a protective link in series with the current limiting fuse, a secondary circuit breaker, and a lightning arrester wherein the current limiting fuse is coordinated with the protective link so that the fuse will not operate in the low current range, is coordinated with the secondary breaker so that secondary faults and overloads will be cleared by the breaker rather than by the fuse, and is also coordinated with the lightning arrester to prevent arrester spark-over during fault interruption and to allow the fuse to be protected by the lightning arrester so that it is less subject to failure due to steep front surges.

SUMMARY OF THE INVENTION

In accordance with the invention, a distribution transformer installed on a high voltage power distribution system having high fault current capability is protected over the entire range of fault currents by a low voltage circuit breaker which opens on low magnitude currents caused by secondary faults, a protective link which melts on low magnitude primary fault currents to disconnect the transformer from the power system, and in series with the protective link, a current limiting fuse which does not operate in the low fault current range but interrupts high magnitude currents caused by low impedance primary faults. The current limiting fuse is disposed within the axial bore in a primary insulating bushing having a conductive line shield on its inner surface to avoid high voltage gradients in the vicinity of the fusible elements of current limiting fuse and minimize corona and radio frequency voltages. The conductive line shield terminates at a point which assures sufficient electrical clearance, and thus high enough dielectric strength, between the line shield and the lower terminal on a melted current limiting fuse to prevent fuse restrike when the full operating voltage appears across the ruptured fuse or at the instant of circuit interruption when a transient switching surge appears across the fuse. The current limiting fuse is coordinated with a lightning arrester so that the arc voltage generated across the current limiting fuse is lower than the switching surge sparkover voltage of the lightning arrester, thus allowing the current limiting fuse to be protected by the lightning arrester and making it less subject to failure due to a steep front surge.

BRIEF DESCRIPTION OF THE DRAWING

The above and still further objects and advantages of the invention will become more apparent from the following detailed description of a preferred embodiment of the invention especially when taken in conjunction with the accompanying drawing wherein.

DESCRIPTION OF THE PREFERRED EMBODIMENT

Figure 1:
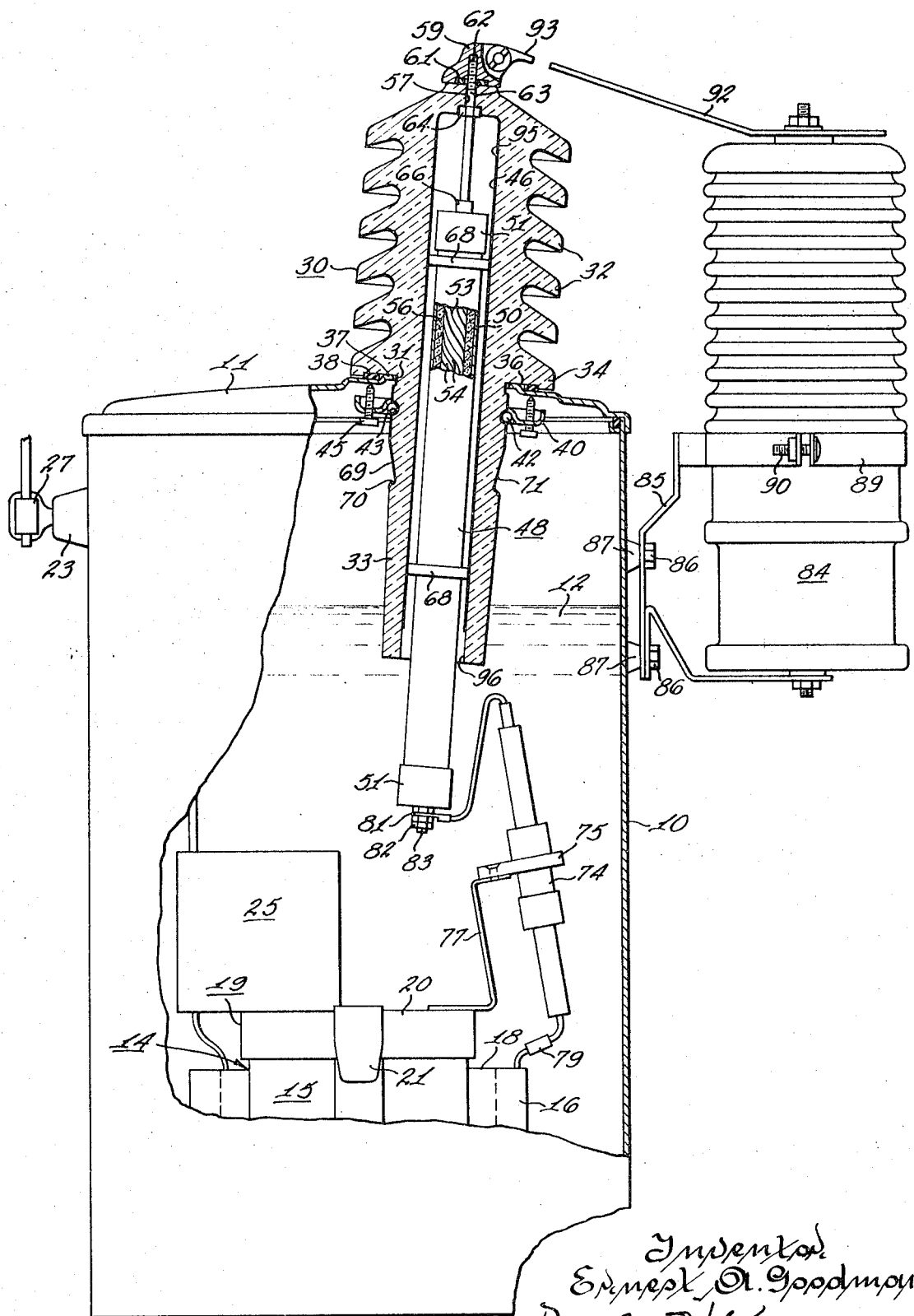
FIG. 1 is a front view of a distribution transformer embodying the invention with a portion of the tank sidewall cut away to illustrate the internal construction and with the primary bushing and the current limiting fuse shown in section.

Referring to FIG. 1 of the drawing, a distribution transformer incorporating a preferred embodiment of the invention has a metallic cover 11. Casing 10 contains an insulating dielectric fluid 12 such as transformer oil and encloses a transformer core and coil assembly 14 immersed in the oil 12 and including a magnetic core 15 linked by a transformer primary winding 16 and secondary windings 18. The core 15 and transformer windings are held as an integral unit by an end frame 19 including an inverted upper pan 20 and a lower pan (not shown) which fit over the upper and lower ends of core 15 and metal end straps 21 affixed to the bottom pan that extend through apertures (not shown) in upper pan 20 and are bent over to lock the assembly together.

Figure 2:
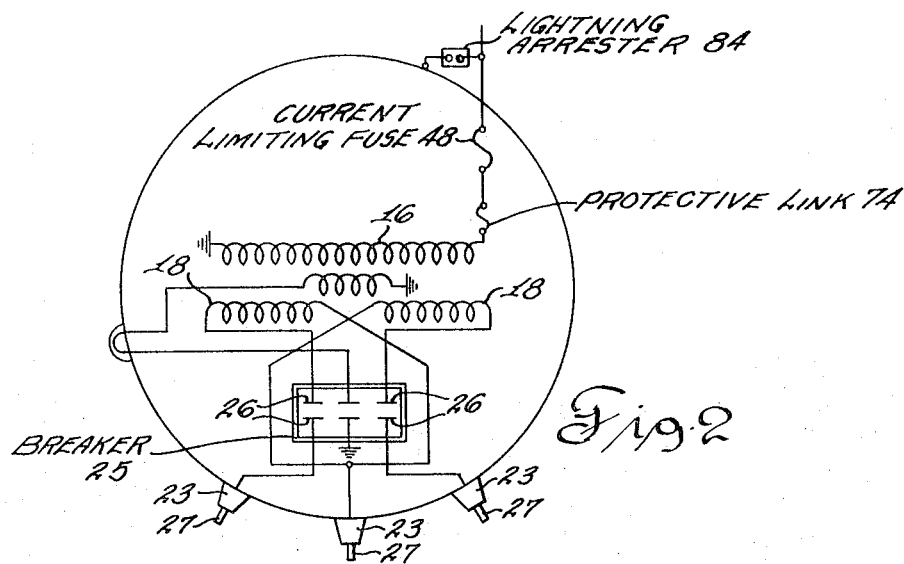
FIG. 2 is a schematic circuit diagram of the distribution transformer of FIG. 1.

Secondary insulating bushings 23 may be mounted on the sidewall of casing 10. A low voltage, or secondary, circuit breaker 25 mounted on end frame 19 under the oil 12 has pairs of contacts 26 (See FIG. 2) connected between the transformer secondary windings 18 and the terminal studs 27 of the secondary bushings 23. Secondary breaker 25 has a bimetallic element (not shown) in series with the secondary winding 18 in conventional manner and is responsive to both overtemperature of the oil 12 and overload current to trip the breaker and open contacts 26 to disconnect the load from the transformer.

An elongated high voltage bushing 30 preferably of wet process porcelain extends through an aperture 31 in cover 11 so that its lower end is beneath the oil 12. Bushing 30 may have a plurality of skirts 32 external of casing 10, a smaller diameter shank 33 that extends through aperture 31, and an annular shoulder 34 between shank 33 and the skirts 32. An annular undercut groove 36 in shoulder 34 fits over an upwardly extending annular embossing 37 surrounding aperture 31 or casing 10. A ring gasket 38 of suitable resilient material surrounds embossing 37 and fits within undercut groove 36 in shoulder 34 of bushing 30 so that the bushing acts in the manner of an overhanging lip to retain the gasket 38 in position. An annular keeper plate 40 of U-shape cross section surrounds the shank 33 adjacent cover 11, and its radially inner edge is disposed above and presses down against a tensioned garter spring 42 disposed within a circumferential groove 43 in shank 33. Pointed, paint-piercing bolts 45 fitting within threaded apertures in keeper plate 40 engage the inner surface of cover 11 to clamp bushing 30 to cover 11, compress gasket 38, and effectively seal the opening.

Bushing 30 has a central bore 46 therethrough, and a current limiting fuse 48 is disposed within central bore 46. Current limiting fuse 48 may be of, but is not limited to, the type commercially available from the Kearney Division of Kearney-National Inc. of Atlanta, Georgia under the designation Type A. Current limiting fuse 48 includes an insulating tube 50, metallic ferrules 51 at the ends of tube 50, and means (not shown) for providing a hermetic seal between tube 50 and ferrules 51. Insulating tube 50 encloses an axially extending spider 53 of suitable insulating material on which one or a plurality of fusible wire elements 54 are disposed in spaced relation and are electrically connected at their ends to the ferrules 51 and are surrounded by pulverulent filler 56 of an inorganic material such as quartz sand. Current limiting fuse 48 may be rated to interrupt up to 40,000 amperes RMS at potentials up to 22 kilovolts.

Porcelain bushing 30 is closed at its upper end except for a relatively small diameter axial aperture 57 communicating with central bore 46. A metallic terminal 59 having means for clamping a power system conductor has an annular groove 61 in its lower surface in which a ring gasket of suitable resilient material is disposed and also has a threaded axial opening 62. A terminal stud 63 having screw threads at its upper end and a keyed circumferential flange 64 extends through aperture 57 in bushing 30 and is engaged within threaded opening 62 in terminal 59. When terminal 59 is rotated relative to stud 63, circumferential keyed flange 64 engages the internal surface of bushing 30 and the ring gasket is compressed within annular groove 61 to clamp terminal 59 to bushing 30. The lower end of terminal stud 63 is mechanically and rigidly, but releasably, linked to a boss 66 on the upper ferrule 51 of current limiting fuse 48. Resilient gaskets 68 surround fuse 48 and maintain it centered within axial bore 46 in bushing 30, but gaskets 68 are not tight fitting within bushing 30 and do not seal the central bore 46.

Below circumferential groove 43 the bushing 30 has an inwardly tapering peripheral portion 69 which terminates at its lower end in an arcuate surface 70, and a ground shield conductive coating 71, e.g., a metallic glaze of copper or a conductive material deposited by a vacuum process or a semiconductive material such as the anticorona compound sold by General Electric Company under the mark RESCON, is applied to the outer surface of bushing 30 from just below shoulder 34 downward over peripheral portion 69 and terminates along the arcuate surface 70. Ground shield coating 71 is in physical contact with garter spring 42, and thus electrically with keeper plate 40 and pointed, paint-piercing bolts 45 so that it is grounded to the metallic cover 11. In the absence of conductive coating ground shield 71, the electric field pattern in the region of garter spring 42 and keeper plate 40 (when the fusible elements 54 of current limiting fuse 48 and semiconductive glaze 95 are at high potential) would give rise to relatively closely spaced equipotential lines which would be concentrated in the vicinity of the garter spring 42, keeper plate 40, and bolts 45 and produce a relatively high voltage gradient around spring 42 and keeper plate 40 which is apt to result in corona discharge and radio and television interference voltages in the air outside of shank 33. In contrast, the conductive coating ground shield 71 distributes the equipotential lines so that they curve away from the shank 33 at the ground shield termination which is at a point well below garter spring 42 and so that they are uniformly graded within the high dielectric material of bushing 30. Hence, a relatively low voltage gradient exists in the air along the length of shank 33 below ground shield conductive coating 71, and the corona threshold is raised in comparison to a structure without the ground shield.

Current limiting fuse 48 may not be effective as an interrupting device at very low fault currents and actually may not clear such a fault. In order to provide protective means over the entire range of fault currents, a "weak" protective link 74 of conventional construction is used in series with current limiting fuse 48 to clear low magnitude fault currents. For example, for a 34.5 kilovolt distribution system (i.e., at 19.9 kilovolts phase to ground) a current limiting fuse rated at 20 amperes can be coordinated for transformers up to 50 kva with a number of conventional protective links, such as No. 3A or No. 5 or No. 5A rated at 34 kilovolts sold by Westinghouse Electric Corporation.

Protective link 74 may be affixed to a terminal board 75 of porcelain or other suitable insulating material supported on a generally Z-shaped bracket 77 mounted on the upper pan 20 of the end frame 19 for the core and coil assembly. A crimp type connector 79 may connect the insulated cable from the lower end of protective link 74 to the transformer coil lead from the primary winding 16. An eye terminal 81 affixed by crimping to the cable from the upper end of protective link 74 may be affixed by a nut 82 to a threaded stud 83 on the ferrule 51 at the lower end of current limiting fuse 48. Such physical arrangement for the protective link 74 shown in the drawing and described herein is illustrative only, and many alternative arrangements may be provided for the protective link.

A conventional lighting arrester 84 shown as being of the gapped valve type may be mounted on the sidewall of casing 10 by a metallic bracket 85. Bracket 85 may be affixed by bolts 86 to female threaded bosses 87 on the sidewall of casing 10 and includes a circular clamping hand 89 encircling the central portion of arrester 84 with spaced apart ends drawn together by screw means 90. A flat plate conductor 92 affixed to the upper terminal of gapped lightning arrester 84 may be spaced from a projection 93 on primary bushing terminal 59 to form an air gap which sparks over when a surge reaches the arrester to permit the surge current to flow to ground through arrester 84 rather than through the transformer. Alternatively lightning arrester 84 may be of the expulsion type or may be a direct connected arrester which would be conductively connected to terminal 59.

In accordance with the invention, the surface forming aperture 57 and the axial bore 46 in bushing 30 is coated with conductive glaze or coating 95 such as a metallic glaze of copper or a metal deposited by a vacuum process or a semiconductive material such as the anticorona semiconductive material sold by General Electric Company under the mark RESCON, to form a line shield and thus eliminate high dielectric stresses in the vicinity of the fusible elements 54 of current limiting fuse 48, but preferably the lower portion 96 of the axial bore 46 is not covered with the conductive glaze 95 so that a clearance of approximately 5 inches exists between the end of the line shield 95 and the lower ferrule 51 on current limiting fuse 48 for transformers connected to 34.5 kilovolt power systems having phase-to-ground voltages of approximately 19.9 kilovolts. Line shield 95 eliminates corona in the vicinity of ground shield 71 and of the fusible elements 54 of current limiting fuse 48 and places essentially all of the voltage stress across the porcelain of bushing 30 rather than across the air adjacent the fusible elements 54.

If sufficient clearance were not provided between the lower end of line shield 95 and the lower ferrule 51 on current limiting fuse 48, the semiconductive line shield 95 would remain electrically in parallel with the fusible elements 54. When the fusible elements 54 melt and open the circuit, full operating voltage would exist between the bottom extremity of the line shield 95 and the bottom ferrule 51 on the current limiting fuse. Further, at the instant of circuit interruption a transient switching surge (which may approach 65 kilovolts for a current limiting fuse for a nominal 19.9 kilovolt phase-to-ground line voltage) appears across the fuse, and thus between the bottom ferrule 51 of the fuse 48 and the line shield 95. Either of these voltages could result in flashover between the bottom fuse terminal 51 and the line shield 95 and render the fuse and its operation useless.

The clearance between line shield 95 and lower ferrule 51 provided by the portion 96 of the axial bore 46 which is not coated with conductive material and the portion of the fuse tube 50 extending below bushing 30 is sufficient to insure that: (a) the ruptured fuse 48 retains sufficient dielectric strength to the semiconductive line shield 95 and to the power line to prevent a fuse restrike or a physical or electrical bushing failure, and (b) the corona level and the radio frequency voltage to the tank ground is within industry standard even when 10 percent overvoltage is applied to primary bushing terminal 59.

Such clearance between line shield 95 and lower ferrule 51 may be approximately four inches for transformers connected to power systems having phase-to-ground voltage of approximately 14.4 kilovolts, and it will also be appreciated that in alternative embodiments such electrical clearance may be accomplished by an arrangement wherein lower portion 96 is also coated with semiconductive material so that the line shield 95 extends down to the lower extremity of central bore 46 and the current limiting fuse 48 depends further below the lower end of bushing 30 to provide the required electrical clearance.

Figure 3:
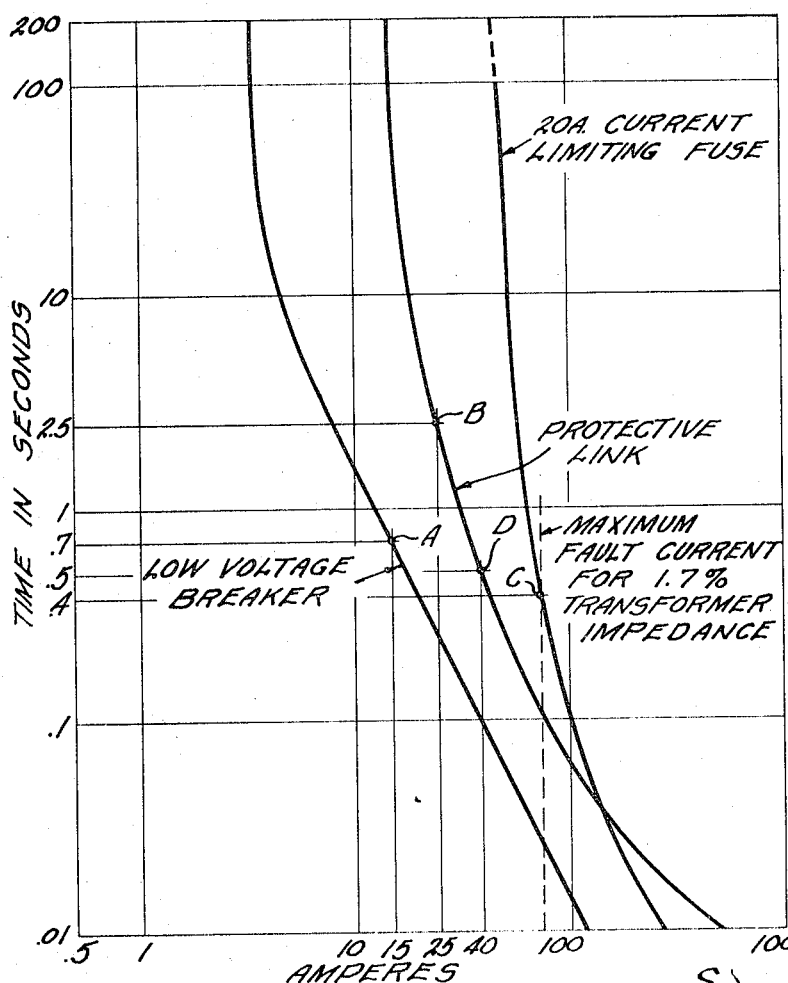
FIG. 3 is a typical set of time-current characteristic curves showing coordination of the current limiting fuse with the protective link and the secondary breaker.

FIG. 3 shows typical time-current characteristic coordination curves for a preferred embodiment of the invention using a current limiting fuse 48 rated at 20 amperes in series with a standard Westinghouse Electric Corporation protective link No. 3A with all current magnitudes referred to equivalent primary currents. It will be noted that the secondary breaker 25 opens before the protective link 74 melts in the lower current range and thus would clear any secondary fault or overload. For example, at point A secondary breaker 25 would open on an equivalent primary current of 15 amperes in approximately 0.7 seconds, and this magnitude of current would require 200 seconds to melt protective link 74. Further, a fault current in the low current range such as 25 amperes would melt protective link 74 in approximately 2-½ seconds at point B of FIG. 3 but would not be interrupted by the current limiting fuse, and the maximum fault current for a 1.7 percent impedance transformer shown to be 75 amperes would be interrupted by current limiting fuse 48 in approximately 0.4 seconds at point C. A fault current of approximately 40 amperes would melt protective link 74 in approximately 0.5 seconds at point D, but the current limiting fuse 48 would require more than 1,000 seconds to clear this fault. The curves for the protective link 74 and current limiting fuse 48 cross at approximately 150 amperes, and thus the current limiting fuse 48 interrupts the circuit for overcurrents above this value and the protective link 48 melts to disconnect the transformer on overcurrents below this value.

Current limiting fuse 48 is also coordinated with lightning arrester 84 so that the maximum switching surge voltage resulting from fuse operation is below the sparkover voltage of the arrester for such switching surge, thereby allowing fuse 48 to be protected by the arrester so that it is less subject to failure caused by steepfront surges and preventing arrester failure from a power follow current after such a switching surge.

While only a single embodiment of the invention has been illustrated and described, it should be understood that I do not intend to be limited to the single embodiment for many modifications and variations thereof will be obvious to those skilled in the art.

The embodiments of the invention in which an exclusive property or privilege is claimed are defined as follows:

1. In a distribution transformer for use on high voltage power distribution system of high fault current capability and having a core and coil assembly including a magnetic core linked by primary and secondary transformer windings immersed in a dielectric insulating fluid within a casing closed by a metallic cover having an aperture therein,
   an elongated primary insulating bushing having an axial opening mounted on said cover and extending through said aperture,
   an elongated current limiting fuse having a fusible element and terminals at its upper and lower ends disposed within said axial opening so that said lower lower end carrying said terminal depends below said bushing,
   a protective link immersed in said dielectric fluid and connected in series with said current limiting fuse and said primary transformer winding, and
   a conductive line shield coating on the inner surface of said bushing forming said axial opening for reducing the voltage gradient around said fusible element to said metallic cover,
   the clearance between said conductive line shield and said lower terminal of said fuse being sufficient to prevent flashover therebetween immediately after said fuse has ruptured and when the voltage of said power system subsequently appears across said ruptured fuse.

2. In a distribution transformer for use on high voltage power distribution system of high fault current capability and having a core and coil assembly including a magnetic core linked by primary and secondary transformer windings immersed in a dielectric insulating fluid within a casing closed by a metallic cover having an aperture therein,
   an elongated primary insulating bushing having an axial opening mounted on said cover and extending through said aperture,
   an elongated current limiting fuse having a fusible element and terminals at its upper and lower ends disposed within said axial opening so that said lower end carrying said lower terminal depends below said bushing,
   a protective link immersed in said dielectric fluid and connected in series with said current limiting fuse and said primary transformer winding, and
   a conductive line shield coating on the inner surface of said bushing forming said axial opening for reducing the voltage gradient around said fusible element to said metallic cover,
   the clearance between said conductive line shield and said lower terminal of said fuse being sufficient to prevent flashover therebetween immediately after said fuse has ruptured and when the voltage of said power system subsequently appears across said ruptured fuse, the lowest portion of said inner surface of said bushing defining said axial opening not being covered by said line shield conductive coating and the clearance between said line shield conductive coating and said lower terminal being sufficient to provide high enough dielectric strength to prevent restrike of said fuse or flashing from said lower terminal to said line shield by the transient switching surge voltage occurring at the instant of interruption.

3. In the combination defined by claim 2 and including metallic means engaging the periphery of said bushing adjacent said cover for clamping said bushing to said cover, and a conductive ground shield coating on the outer periphery of said bushing extending above and below said clamping means.

4. In the combination defined by claim 2 wherein said current limiting fuse is coordinated with said protective link so that said protective link will rupture before said fuse on currents in the lower portion of the primary fault current range.

5. In the combination defined by claim 4 and including a low voltage circuit breaker immersed in said insulating fluid within said casing and having a pair of contacts and a bimetallic element in series with said secondary transformer winding and being adapted to open said pair of contacts in response to flow of secondary fault current through said bimetallic element and also in response to heating of said bimetallic element to a predetermined temperature by said insulating fluid, and wherein said protective link is coordinated with said circuit breaker so that said circuit breaker opens said pair of contacts before said protective link melts in the lower range of fault currents to which said transformer is subjected.

6. In the combination defined by claim 5 wherein said primary bushing has a terminal electrically connected to said upper terminal of said current limiting fuse and also including a lightning arrester mounted on the exterior of said casing and having one terminal grounded and the other terminal thereof electrically coupled to said primary bushing terminal and wherein said lightning arrester is coordinated with said current limiting fuse so that it does not sparkover on the switching surge transient voltage developed across said fuse when it operates.

7. In the combination defined by claim 2 wherein the phase-to-ground voltage of said power system is approximately 19.9 kilovolts and said current limiting fuse is rated to interrupt up to approximately 40,000 amperes at this voltage and the clearance between said line shield conductive coating and said lower terminal of said current limiting fuse is approximately 5 inches.

8. In the combination defined by claim 2 wherein the phase-to-ground voltage of said power system is approximately 14.4 kilovolts and said current limiting fuse is rated to interrupt up to approximately 40,000 amperes at this voltage and the electrical clearance between said line shield conductive coating and said lower terminal of said current limiting fuse is approximately 4 inches.

9. In the combination defined by claim 1 wherein said line shield conductive coating extends down to the lower end of said inner surface of said bushing defining said axial opening and the clearance between said line shield conductive coating and said lower terminal on said fuse is sufficient to prevent restrike of said fuse or flashing from said lower terminal to said line shield by the transient switching surge voltage occurring at the instant of fuse interruption.

10. In the combination defined by claim 9 and including metallic means engaging the periphery of said bushing adjacent said cover for clamping said bushing to said cover, and a conductive ground shield coating on the outer periphery of said bushing extending above and below said clamping means.

* * * * *

PO-1050
(5/69)

UNITED STATES PATENT OFFICE
CERTIFICATE OF CORRECTION

Patent No. 3,666,992  Dated May 30, 1972

Inventor(s) Ernest A. Goodman

It is certified that error appears in the above-identified patent and that said Letters Patent are hereby corrected as shown below:

Column 7, line 19, delete one "lower"; line 20, after "said" insert --- lower ---.

Signed and sealed this 1st day of May 1973.

(SEAL)
Attest:

EDWARD M. FLETCHER, JR.  ROBERT GOTTSCHALK
Attesting Officer  Commissioner of Patents